US008108090B2

(12) United States Patent   (10) Patent No.: US 8,108,090 B2
Bauer   (45) Date of Patent: Jan. 31, 2012

(54) STRADDLE CARRIER WITH AUTOMATIC STEERING

(75) Inventor: Reinhard Bauer, Remlingen (DE)

(73) Assignee: Noell Mobile Systems GmbH, Würzburg (DE)

( * ) Notice: Subject to any disclaimer, the term of this patent is extended or adjusted under 35 U.S.C. 154(b) by 996 days.

(21) Appl. No.: 12/075,274

(22) Filed: Mar. 10, 2008

(65) Prior Publication Data

US 2009/0129904 A1   May 21, 2009

(30) Foreign Application Priority Data

Nov. 16, 2007 (DE) .................... 20 2007 016 156 U

(51) Int. Cl.
*G06F 19/00* (2011.01)
*B65G 57/00* (2006.01)

(52) U.S. Cl. ......... 701/23; 701/50; 414/792.8; 414/389; 180/411; 212/316; 212/344

(58) Field of Classification Search ...................... 701/23
See application file for complete search history.

(56) References Cited

U.S. PATENT DOCUMENTS

| | | | | |
|---|---|---|---|---|
| 4,835,691 A | * | 5/1989 | Rotem et al. ............ | 701/23 |
| 5,509,486 A | * | 4/1996 | Anderson ................. | 172/6 |
| 5,999,865 A | * | 12/1999 | Bloomquist et al. ...... | 701/25 |
| 6,694,233 B1 | * | 2/2004 | Duff et al. ................ | 701/23 |
| 6,901,624 B2 | * | 6/2005 | Mori et al. ............... | 15/319 |
| 2006/0229774 A1 | * | 10/2006 | Park et al. ................ | 701/23 |

FOREIGN PATENT DOCUMENTS

| DE | 38 21 892 | 2/1990 |
|---|---|---|
| DE | 44 15 419 | 11/1995 |
| DE | 100 39 629 | 3/2002 |

OTHER PUBLICATIONS

Thrun, S, "Probabilistic Robotics", Communications of ACM, Mar. 2002, V45, No. 3, P52-57.*
Durant-Whyte H, Pagac D., Roger, B., Stevens M., & Nelmes G. "Am Autonomous Straddle Carrier for Movement of Shipping Containers", IEEE Robotics and Automation, Sep. 2007, pp. 14-23.*

* cited by examiner

*Primary Examiner* — Thomas Black
*Assistant Examiner* — Lin B Olson
(74) *Attorney, Agent, or Firm* — Collard & Roe, P.C.

(57) ABSTRACT

A straddle carrier for transporting and stacking freight containers, with automatic steering, is made up of two chassis beams having steerable wheels, for traveling over the container stack. At least one laser scanner measures the distance to a container wall from different angles, and passes the measurement signals to an electronic control, which calculates a steering angle reference value for the electronically regulated vehicle steering from the measurement signals.

8 Claims, 3 Drawing Sheets

STRADDLE CARRIER WITH AUTOMATIC STEERING

CROSS-REFERENCE TO RELATED APPLICATIONS

Applicant claims priority under 35 U.S.C. §119 of German Application No. 20 2007 016 156.5 filed Nov. 16, 2007.

BACKGROUND OF THE INVENTION

1. Field of the Invention

The present invention relates to a straddle carrier for transporting and stacking freight containers with automatic steering made up of two chassis beams having steerable wheels for traveling over the container stack.

The proposed straddle carrier is suitable for transshipment of containers, where there is a need to steer the vehicle automatically, in precise and reliable manner, along stacks of containers.

More specifically, the invention relates to a straddle carrier as used in ocean harbors and container terminals worldwide, for transporting and stacking freight containers. They consist of two chassis beams having wheels, which travel on the right and the left of the container stack, and vertical supports set onto them, which form a portal with the machinery platform that lies above them. This portal moves over the containers and picks them up with its lifting mechanism, or sets them down. The straddle carriers have a diesel-electric or diesel-hydraulic drive and, in most cases, an electro-hydraulic steering. A steering computer regulates the hydraulic proportional valves as determined by a steering wheel setting by the driver, which valves in turn move the wheels to the steering setting, by way of hydraulic cylinders.

Straddle carriers must be steered over long stacked container rows. The chassis beams travel on the right and the left of the stacks being traveled over, in the narrow alleys between the container rows. The vehicle operator must therefore steer very precisely and attentively, and also cannot drive very fast, because the clear space between the chassis beams and the containers is very narrow, and sideswipes of the vehicle against the containers and other collisions must be avoided. In order to support the driver and to relieve him of concentrated, exhausting steering, automatic steering would be desirable.

2. The Prior Art

Automatically steered straddle carriers are known. They use generally known methods, in most cases, as they are used for navigation for all autonomous, driverless lift trucks. Namely individual systems or combinations of:
  satellite navigation (differential GPS),
  radar navigation,
  inertial navigation (gyroscopes),
  transponder navigation (with markers buried in the floor),
  guide wire navigation
or the like are used. For fully automatic steering, these known navigation systems must allow determination of the vehicle position in the centimeter range, making them very complicated and costly.

Navigation with laser scanners is also known. Thus, for example, DE 38 21 892 C1 shows determination of the position of a vehicle using laser scanners, whereby fixed reflectors must be installed on the light posts of the harbor facility, for example, and the laser scanner constantly measures distances and angles to the reflectors. The current vehicle position is determined by comparison with the known positions of these reflectors, which is stored in the memory of the electronic vehicle control. However, automatic steering of the vehicle using laser scanners is not indicated in DE 38 21 892 C1.

Furthermore, the use of laser scanners for different positioning and position determination tasks for cranes and container stackers is known, for example from DE 100 39 629 B4 and DE 44 15 419 A1, but not for fully automatic steering of a straddle carrier above the container row.

All of these known methods for fully automatic vehicle guidance have several disadvantages: They must be precise to the centimeter, and are therefore very complicated and orient themselves not by the container stack itself, but rather by external markers, such as satellites, reflectors, transponders, and the like. They are used to steer the vehicle along a path that is only theoretical, on which the container stack is supposed to stand. This path is stored in the memory of the vehicle control. If the containers are in fact not set down precisely on this theoretical path, contact, collisions, damage, and therefore interruptions in operation can occur. Furthermore, the paths must be changed in all the vehicle controls every time that the containers have to be stacked differently for logistical reasons. Such change is quite complicated to implement in terms of software technology.

Purely manual operation by the driver, on the other hand, has the disadvantage that the driver must steer the vehicle over the container stack, which is often several hundred meters long, very attentively and with great concentration. He or she tires, loses his or her ability to concentrate after some time, and must therefore drive relatively slowly, which limits the transshipment capacity of the vehicle. Also, he or she must constantly look vertically down onto the gap between chassis beam and container row for steering, and can observe the travel distance that lies ahead only with difficulty.

Furthermore, collisions frequently occur if the driver has not moved the lifting mechanism high enough, due to lack of attentiveness, when moving in over a container stack or when approaching a part of the container row that is stacked higher. Then the spreader or the load on the spreader hits against the container that is stacked higher, which causes significant damage.

SUMMARY OF THE INVENTION

It is therefore an object of the invention to eliminate the disadvantages of the known state of the art, and to develop a straddle carrier with fully automatic steering, which orients itself directly by the container stack, relieves the driver of concentrated, exhausting steering, offers protection against collisions, and in this connection makes do without the great expenditure of a complete navigation system.

These and other objects are achieved, according to the invention, by a straddle carrier wherein at least one laser scanner measures the distance to a container wall from different angles and passes the measurement signals to an electronic control which calculates a steering angle reference value for the electronically regulated steering from the measurement signals. Advantageous embodiments of the invention are discussed below.

According to the invention, a straddle carrier is provided for transporting and stacking freight containers, with fully automatic steering when traveling over the container stack, in which at least one laser scanner measures the distance to a container wall from different angles, and passes the measurement signals to an electronic control, which calculates a steering angle reference value for the electronically regulated vehicle steering from these signals.

It is advantageous if the laser scanner represents a two-dimensional (2D) laser scanner. Furthermore, it is advantageous to dispose the laser scanner in the front of the chassis beam. Of course, a laser scanner can also be disposed at the back of the chassis beam, for reverse travel.

Furthermore, it is advantageous to dispose the laser scanner or a 2D laser scanner in the ram buffer. Robust, commercially available 2D laser scanners are suitable as laser scanners. It is advantageous to dispose multiple laser scanners on the vehicle. In order to recognize lower container rows, it is sufficient to dispose laser scanners in the vehicle beam, preferably in the ram buffer, approximately at the height of 120 cm. In this way, the first lower container layer is detected at half its height, and can serve for orientation; however, containers can be stacked in layers of two, three, or four high, on top of one another. The containers of these upper layers have not been detected by the lower laser scanners until now. If these upper containers are not stacked precisely on top of one another, or have been displaced due to major influences such as a storm, they represent an obstacle against which the straddle carrier can come up. Therefore it is advantageous to affix additional laser scanners in the vertical supports of the straddle carrier. The laser scanners are affixed so that these containers can also be detected, i.e. at the center height of the second, third, or fourth container layer, in each instance. In this way, projecting containers in the upper layers can be recognized as an obstacle, so that the vehicle brakes in time or is steered to evade it, if there is sufficient space available to the side.

It is furthermore advantageous to dispose laser scanners on the supports of the straddle carriers so that they can be changed in height. In this way, the height can be adapted to different container heights. This adaptation can take place along a holder rail, automatically, by means of a setting motor.

It is advantageous if the straddle carrier automatically brakes if it comes closer to the container wall than a minimum distance. In this way, collisions are prevented.

Furthermore, when the container wall is detected, an acoustical or optical signal, for example a flashing light, can indicate to the driver that the automatic steering can be activated, so that he switches over to it. If such switching should not be done manually, the steering can be activated automatically when the container wall is detected.

The steering of the vehicle automatically orients itself by the containers, via the laser scanners. In the case of larger gaps, for example 40 feet and more, in the container row, the automatic steering with the laser scanner orients itself by the container wall of the adjacent row, in each instance. If there is a gap in this row, it orients itself by the right adjacent row, until the row being traveled over is again detected by the laser. In this way, even larger gaps can be bridged. If there are gaps both on the left and on the right, and in the center, and no container can be detected by the laser scanner, the driver is acoustically and optically prompted to steer manually, like at the end of a stack. If no intervention occurs within a predetermined time, for example a second, the vehicle is braked.

Multiple containers may be stacked on top of one another in two, three, or four layers. When multiple scanners are disposed on top of one another for detecting such multiple containers stacked on top of one another, detections by the laser scanners can already take place at some distance, and when entering a row, even around a curve. In this way, it is determined whether containers are stacked by two, three, or four on top of one another. The electronic lift mechanism control can then compare the stack height with the current lift height of the spreader, which can be detected via an absolute value incremental encoder on the hoist winch, for example, and check whether the spreader and load are standing high enough so that they can travel over the container stack. If the spreader and load are not standing high enough, an automatic device can move the lift mechanism to the required height. In this connection, the approach speed of the chassis to the container that is in the way is automatically reduced, or completely stopped, until the lift mechanism has reached the required height. In this way, collisions of the spreader or the load suspended on it with stacked containers are automatically prevented.

The measurement values of the right and the left laser scanner are checked against one another for plausibility, by means of an electronic control.

BRIEF DESCRIPTION OF THE DRAWINGS

Other objects and features of the present invention will become apparent from the following detailed description considered in connection with the accompanying drawings. It should be understood, however, that the drawings are designed for the purpose of illustration only and not as a definition of the limits of the invention.

In the drawings, wherein similar reference characters denote similar elements throughout the several views.

DETAILED DESCRIPTION OF THE PREFERRED EMBODIMENTS

Figures 1, 2:
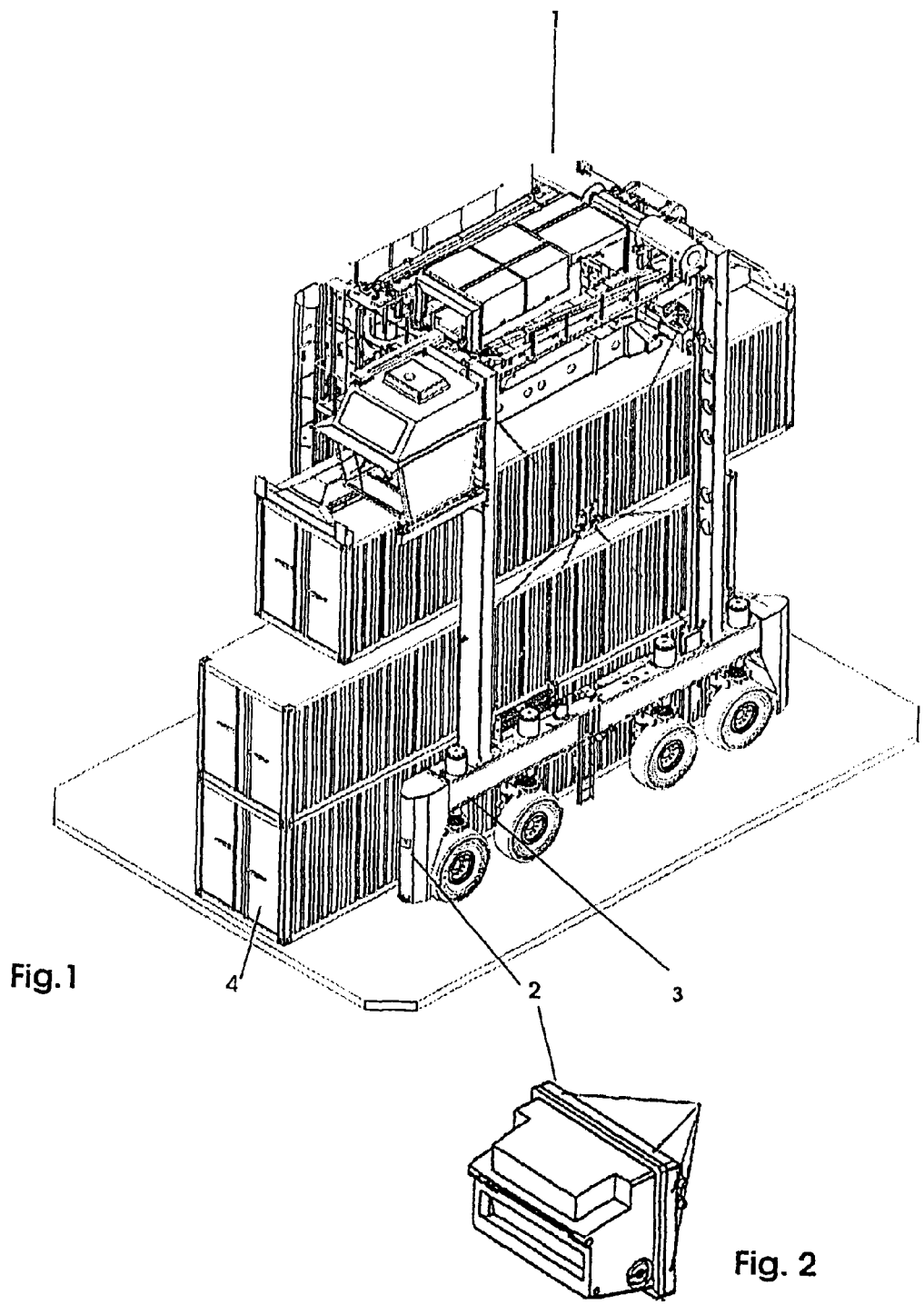
FIG. 1 is a side view of a straddle carrier, while traveling over a container stack, whereby the laser scanner is affixed to the front left chassis beam, protected in the ram buffer.
FIG. 2 shows the laser scanner in FIG. 1.
Figure 3:
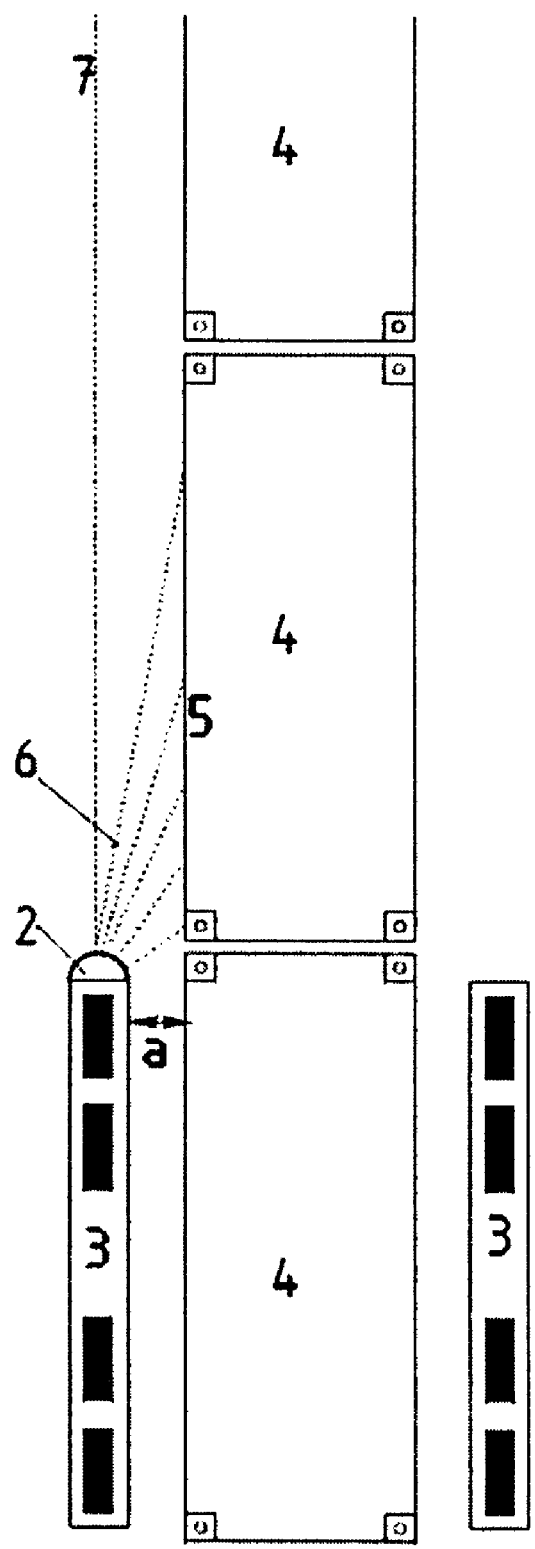
FIG. 3 is a top view of chassis beam and container row while traveling over a container row.
Figure 4:
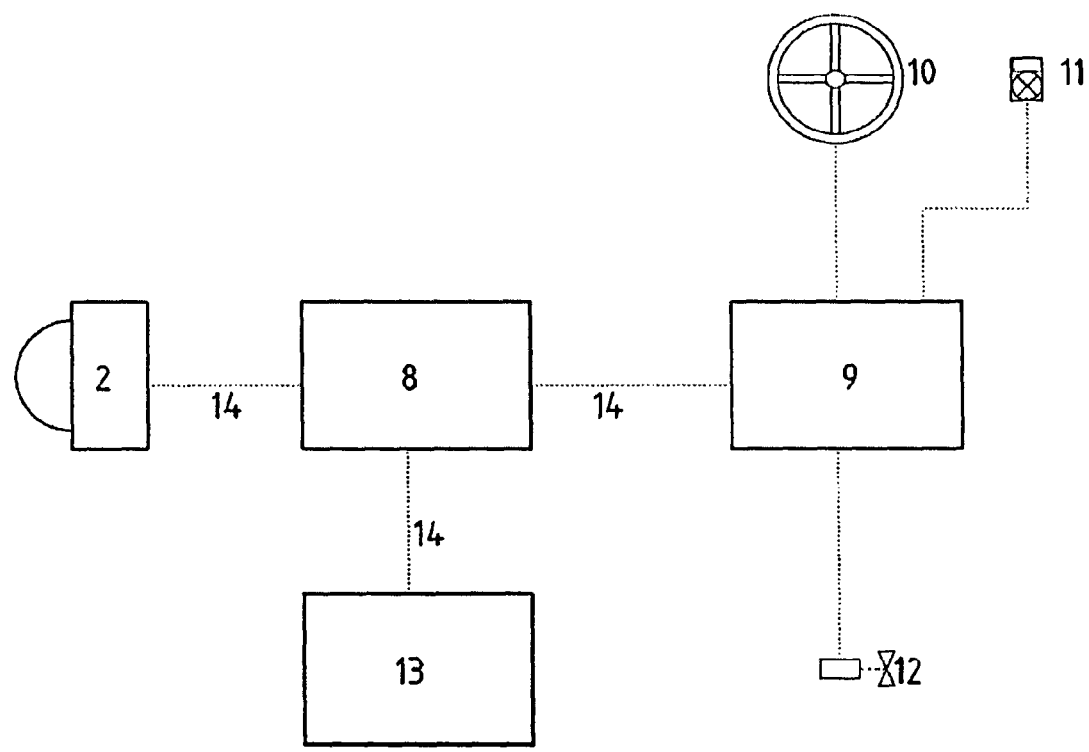
FIG. 4 is a block schematic of the automatic steering system.

Referring now in detail to the drawings and in particular, FIG. 1 shows a staddle carrier 1 including chassis beams 3 having steerable wheels for traveling over a container stack. A robust 2D laser scanner 2 is attached at the front of chassis beam 3 of straddle carrier 1. Scanner 2 is suitable for applications in the outdoors and on vehicles. It can be affixed at a height of approximately 120 cm. It transmits laser beam 6 (See FIG. 3) into different horizontal directions, using a rotating mirror, and thereby scans the surroundings. The laser beam is reflected back into scanner 2 from obstacles such as container wall 5, for example; the scanner determines the distance from the obstacle by way of the running time of beam 6, in each instance (FIG. 4).

Each distance value, together with the related angle value, is transmitted to an electronic control 8 by way of data lines 14, in which control a horizontal 2D image of the surroundings in polar coordinates is therefore present. See FIG. 4. When the straddle carrier travels over a container stack, laser beams 6 are reflected by container wall 5 as an obstacle. Electronic control 8 then converts the polar coordinates into Cartesian coordinates, in accordance with known geometric and trigonometric formulas (which are already taught in the mathematics classes of schools of higher education, and are here therefore presumed to be known to a person skilled of the art), and determines the distance a between chassis beam and container wall as well as the orientation angle (course angle) phi of the vehicle relative to the container wall from these calculations.

The electronics of electronic control 8 can furthermore calculate a reference steering angle for the wheels to turn to, from these two variables, in accordance with known formulas. This steering angle reference value in turn is transmitted to steering computer 9 of the electro-hydraulic steering, by way of data lines 14 (e.g. controller area network (CAN) bus), which steering then regulates turning the wheels through hydraulic steering value 12 to this reference steering angle.

All of these operations take place cyclically, approximately every 100 m msec. Thus, the vehicle or straddle carrier 1 is automatically steered along the container stack, without making contact, even if containers 4 are not standing precisely in their reference position, stand slightly slanted, or are offset relative to one another.

In this connection, it is advantageous to use laser beam 7 that is emitted precisely or straight in the travel direction of the vehicle, in order to automatically recognize possible obstacles in the travel alley (e.g. other vehicles or projecting containers), and to brake the vehicle when it approaches an obstacle. For this purpose, the measured distance is converted, using the generally known movement equations of Newtonian mechanics, into a permissible maximal speed for the vehicle, which again is passed to the electronic undercarriage regulator 13 for the travel speed, by way of the data lines 14 or field bus, and this regulator brakes the vehicle or straddle carrier 1.

Furthermore, it is advantageous to use the distance a between container wall 5 and chassis beam 3, which is constantly being recalculated, in order to brake the vehicle if there is a risk of contact. The farther the vehicle is from the center reference distance, the more it is braked and has the possibility of automatically steering back towards the center. If the chassis beam approaches the container wall by a few centimeters, a full stop occurs, in order to avoid contact if at all possible.

For safety reasons, both the steering angle itself and its change speed (ramp) are variably limited in the electronic control, as a function of the current travel speed, in order to prevent sudden, jolt-like steering at high speeds.

The sequence of operations proceeds as follows:

The driver manually steers the vehicle over the first container of the stack. As soon as laser scanner 2 has detected container wall 5 situated between chassis beams 3, a blinking light on push button 11 indicates to the driver that he or she can turn on the automatic steering, by pressing button 11. After it has been turned on, the blinking light switches to a constant light, and thus indicates that the automatic steering is active. The driver then no longer has to steer, but rather only has to drive the vehicle using the power pedal and the brake, and observe the area that lies ahead, in the direction of travel. If necessary, he or she can turn the automatic laser steering off at any time, and perform a manual intervention using steering wheel 10. At the end of the container stack, or in case of problems, an acoustical warning sound and an optical signal indicate that the driver must steer manually again. If no movement on steering wheel 10 takes place within a short period of time, the vehicle is automatically stopped, with a fast stop.

However, "threading in" above the first container of a row can also take place automatically. When the first container of a row is approached, the electronic control can already recognize the position of container wall 5 using the laser measurement values, at some distance, and automatically steer the vehicle over the first container. For this purpose, it is advantageous to have a laser scanner 2, in each instance, on both chassis beams 3, in other words on the right and on the left, and to check their measurement values against one another for plausibility, in electronic control 8. Thus, it can also be recognized, because of the standardized container width, whether one is actually approaching a container or another obstacle that cannot be traveled over. In the case of multiple scanners disposed on top of one another for detecting multiple containers stacked on top of one another, which are stacked in two, three, or four layers, a signal of the scanner ensures, if necessary, that the lift mechanism moves so high that harmless travel over the containers with or without a load is made possible, or that the vehicle is braked.

If one wants to use the automatic steering also for reverse travel, one must, of course, affix additional laser scanners at the rear of the chassis beams.

The proposed solution has the following advantages:

The straddle carrier is steered along a container stack in fully automated and contact-free manner, even if the containers are not standing precisely on the reference line, or stand at a slight slant, or are offset slightly relative to one another.

In this way, the driver is relieved of stressful, concentrated steering. He or she can observe the travel area that lies ahead, instead of the chassis beam below him or her, and can drive faster longer.

Because it is automatically detected when the straddle carrier is situated above a container row, the existing speed limitation that is present in this case can automatically be cancelled out via the tilt protection. The vehicle can move over the stack faster than before.

In this way, the transshipment capacity of the machine increases.

The risk of contact or collision is reduced.

The effort and expenditure is less than when using complete navigation systems for automatic steering, such as a differential global positioning system (DGPS), radar navigation, transponders, etc.

Accordingly, although only a few embodiments of the present invention have been shown and described, it will become apparent that many changes and modifications may be made thereunto without departing from the spirit and scope of the invention.

What is claimed is:

1. A straddle carrier for transporting and stacking freight containers comprising:
   (a) first and second horizontally and side by side arranged chassis beams having steerable wheels for travelling over a container stack;
   (b) at least one laser scanner for measuring distance to a container wall from different angles;
   (c) an electronic control for receiving measurement signals sent by said at least one laser scanner; and
   (d) an electronically regulated vehicle steering system;
   wherein said electronic control calculates a steering angle reference value for the electronically regulated steering system from the measurement signals,
   wherein when a measured distance to a container wall is below a certain limit, automatic steering is activated.

2. The straddle carrier according to claim 1, wherein the laser scanner comprises a two-dimensional (2D) laser scanner.

3. The straddle carrier according to claim 1, wherein said first chassis beam travelling on one side of the containers to be stacked and transported comprises a front chassis beam part, vertical supports are set onto said chassis beam allowing the straddle carrier to span layers of containers, and one or more laser scanners are disposed in the front chassis beam or on the vertical supports.

4. Straddle carrier according to claim 3, wherein the at least one laser scanner is disposed in a ram buffer.

5. The straddle carrier according to claim 1, wherein the straddle carrier, when approaching a container stack, detects the height of the container stack and automatically sets a lift mechanism to a selected height in such manner that collision-free travel over the container stack is possible.

6. The straddle carrier according to claim 1, wherein the straddle carrier automatically brakes when going below a minimum distance (a) from the container wall or when approaching a container stack that the straddle carrier cannot travel over.

7. The straddle carrier according to claim 1, further comprising a flashing light indicating to a driver that automatic steering can be activated when a measured distance to a container wall is below a certain limit.

8. The straddle carrier according to claim 1, comprising right and left laser scanners for obtaining measurement values, wherein the measurement values of the right and the left laser scanner are checked against one another for plausibility via the electronic control.

* * * * *